United States Patent
Lee

(10) Patent No.: US 7,648,250 B2
(45) Date of Patent: Jan. 19, 2010

(54) DIRECT TYPE BACKLIGHT ASSEMBLY

(75) Inventor: Min Gyu Lee, Gyeongsangbuk-do (KR)

(73) Assignee: LG. Display Co., Ltd., Seoul (KR)

( * ) Notice: Subject to any disclaimer, the term of this patent is extended or adjusted under 35 U.S.C. 154(b) by 32 days.

(21) Appl. No.: 11/644,050

(22) Filed: Dec. 22, 2006

(65) Prior Publication Data

US 2007/0242446 A1 Oct. 18, 2007

(30) Foreign Application Priority Data

Apr. 12, 2006 (KR) .................. 10-2006-0033228

(51) Int. Cl.
*G09F 13/04* (2006.01)
*G09F 13/08* (2006.01)

(52) U.S. Cl. ................ 362/97.2; 362/260; 362/306; 362/369; 362/634; 362/97.1; 349/64; 349/70

(58) Field of Classification Search ........... 362/260, 362/306, 320, 369, 614, 632–634, 97, 97.1, 362/97.2; 349/64, 70
See application file for complete search history.

(56) References Cited

U.S. PATENT DOCUMENTS

| | | | |
|---|---|---|---|
| 7,128,461 B2 * | 10/2006 | Hwang | 362/632 |
| 7,220,036 B2 * | 5/2007 | Yi et al. | 362/614 |
| 7,264,364 B2 * | 9/2007 | Chen et al. | 362/97 |
| 7,270,467 B2 * | 9/2007 | Kim | 362/634 |
| 2004/0257792 A1 * | 12/2004 | Yu et al. | 362/31 |

\* cited by examiner

*Primary Examiner*—Stephen F Husar
(74) *Attorney, Agent, or Firm*—Brinks Hofer Gilson & Lione

(57) ABSTRACT

A direct type backlight assembly is disclosed, in which a lamp guide is formed in a shape which can absorb an external force to prevent distortion from occurring from contact between the lamp guide and a diffusion plate, and to prevent the diffusion plate from being damaged. The direct type backlight assembly includes a light-emission lamp provided under an LCD panel; a reflecting plate provided on the bottom side of the light-emission lamp; a diffusion plate provided above the light-emission lamp; optical sheets provided on the diffusion plate; and a lamp guide provided on and connected with the reflecting plate, wherein the lamp guide has a supporter having a compression structure, the height thereof varying based on a load applied thereto.

15 Claims, 5 Drawing Sheets

DIRECT TYPE BACKLIGHT ASSEMBLY

This application claims the benefit of the Korean Patent Application No. 10-2006-0033228, filed on Apr. 12, 2006, which is hereby incorporated by reference as if fully set forth herein.

TECHNICAL FIELD

The present invention relates to a backlight unit of a liquid crystal display (LCD) device, and more particularly, to a direct type backlight assembly to minimize a distortion caused by contact between a lamp guide and a diffusion plate.

BACKGROUND

Recently, various flat display devices have been actively studied and researched: for example, liquid crystal display (LCD) devices, field emission display (FED) devices, electro-luminescence display (ELD) devices, and plasma display panels (PDP). Among the flat display devices, the LCD device has been generally used for notebook PCs, desktop monitors and liquid crystal televisions. The LCD device has a high contrast ratio, good gray scale, high-quality moving picture image, and low power consumption.

As shown in FIG. 1, an LCD panel 70 includes an upper substrate 101 provided with a color filter layer 112 to represent various colors; a lower substrate 102 provided with a switching element to change the alignment of liquid crystal molecules; and a liquid crystal layer 100 provided between the upper substrate 101 and the lower substrate 102.

In addition to the color filter layer, the upper substrate 101 includes a black matrix 111 which prevents light leakage; and a common electrode 113 which applies a voltage to the liquid crystal layer 100. The lower substrate 102 includes a pixel electrode 122 as well as a switching element. In this case, the switching element is formed of a thin film transistor 121, and the pixel electrode 122 applies a voltage to the liquid crystal layer 100 in response to a signal outputted from the thin film transistor 121.

A spacer 115 is provided between the upper and lower substrates 101 and 102, and the spacer maintains a predetermined gap between the upper and lower substrate 101 and 102. Around the circumference of the substrate, there is a sealant 116 to prevent the liquid crystal 100 from flowing out.

The LCD panel does not itself emit light. Thus, the LCD device requires an additional light source. For a transmitting type LCD device, an additional light source, for example, a backlight assembly to emit and guide the light is provided.

The backlight assembly may be classified into an edge type and a direct type based on a transmission mode of light.

For the edge-type backlight assembly, a cylindrical line-type light source such as a light-emission lamp (hot cathode or cold cathode) is provided at a lateral side of an LCD panel, so that the light emitted from the light-emission lamp is transmitted to an entire surface of the LCD panel through the use of a transparent light-guiding plate. In case of the direct-type backlight assembly, light-emission lamps are provided under the LCD panel, and are selectively driven, so that the light emitted from the light-emission lamps is diffused to an entire surface of an LCD panel through the use of a light-diffusion plate provided between the light-emission lamps and the LCD panel.

The edge-type backlight assembly is problematic in that it is insufficiently competitive owing to the complicated and complex part sourcing and assembling process. Furthermore, after assembling the lamp into a lamp-housing, the light may leak. Also, the brightness is lowered since the light passes through the light-guiding plate.

To overcome these problems of the edge-type backlight assembly, the direct-type has been proposed, in which the light-emission lamps are selectively provided under the LCD panel, to realize high brightness and uniform luminosity.

For a large display area, it is necessary to provide the light source of uniform luminosity. In this respect, it is preferable to provide the direct-type backlight assembly.

In order to realize the backlight assembly of high brightness by the direct type, a plurality of light-emission lamps may be provided under the display screen, or one light-emission lamp having a bent structure may be provided.

FIG. 2 is an exploded perspective view of illustrating a related art backlight assembly. FIG. 3 is a cross section view along I-I' of FIG. 2. FIG. 4 is a perspective view of illustrating a related art lamp guide 60.

As shown in FIGS. 2 and 3, the direct-type backlight assembly includes a plurality of light-emission lamps 51 which emit the light; a reflecting plate 52 which reflects the light emitted from the lamps 51 toward an LCD panel (not shown); a light-diffusion plate 55 which is provided above the light-emission lamps 51; optical sheets 56 which are comprised of a light-diffusion sheet and a prism sheet; a case 53 which fixes and supports the various elements including the light-emission lamps 51; and a bezel 71 of stainless steel which is provided on the circumference of the LCD panel to surround the circumferential part except for an effective area to display images.

A lamp guide 60 which is provided inside the case 53 maintains a predetermined gap between the light-emission lamps 51 and the reflecting plate 52; and support sides (not shown) which are provided at both ends of each light-emission lamp 51 to support and fix each light-emission lamp 51.

The lamp guide 60 supports the light-emission lamps and prevents the light-diffusion plate 55 and the optical sheets 56 from sagging. The support side fixes the light-emission lamp 51, and stably maintains the light-diffusion plate 55 and the optical sheets 56 thereon.

The lamp guide 60 is provided in the space between the light-diffusion plate 55 and the reflecting plate 52. As shown in FIG. 4, the lamp guide 60 is comprised of a supporter 61 which contacts and supports the light-diffusion plate 55; and holders 62 which are provided to fix and support the light-emission lamp. The supporter 61 of the lamp guide is formed in a conical structure having a fixed height, so that the height of the supporter 61 is does not change, even though an external force is applied thereto.

The light emitted from the light-emission lamps 51 is transmitted to the display area through the light-diffusion plate 55 and the optical sheets 56.

In the direct-type backlight assembly, the light-diffusion plate is formed of polymer material. In this case, if an external force is applied to the LCD device, or the LCD device is distorted, the light-diffusion plate may be moved upward or downward. Thus, whenever the light-diffusion plate contacts the supporter, a distortion occurs due to the contact force therebetween. Also, the scratches may occur in the light-diffusion plate since the supporter of the lamp guide is stronger than the light-diffusion plate. Thus, the light is not diffused in the scratched areas of the light-diffusion plate, and the image may be blurred.

SUMMARY

A direct type backlight assembly is described, in which a lamp guide is formed in a shape which can absorb an external force.

A backlight assembly comprises at least one light-emission lamp provided under an LCD panel including two opposite substrates and a liquid crystal layer provided between the two opposite substrates; a reflecting plate provided on the bottom of the light-emission lamp; a diffusion plate provided above the light-emission lamp; optical sheets provided on the diffusion plate; and a lamp guide provided on and connected with the reflecting plate, wherein the lamp guide has a supporter having a compressible structure.

The supporter of the lamp guide is formed as a compressible structure having at least one curved portion, whereby the height of the supporter is variable based on the external applied force. The supporter may be formed in shape of a hook, wave or spiral.

BRIEF DESCRIPTION OF THE DRAWINGS

The accompanying drawings, which are included to provide a further understanding of the invention and are incorporated in and constitute a part of this application, and illustrate embodiment(s) of the invention. In the drawings.

DETAILED DESCRIPTION

Reference will now be made in detail to examples which are illustrated in the accompanying drawings. Wherever possible, the same reference numbers will be used throughout the drawings to refer to the same or like parts.

Figure 1:
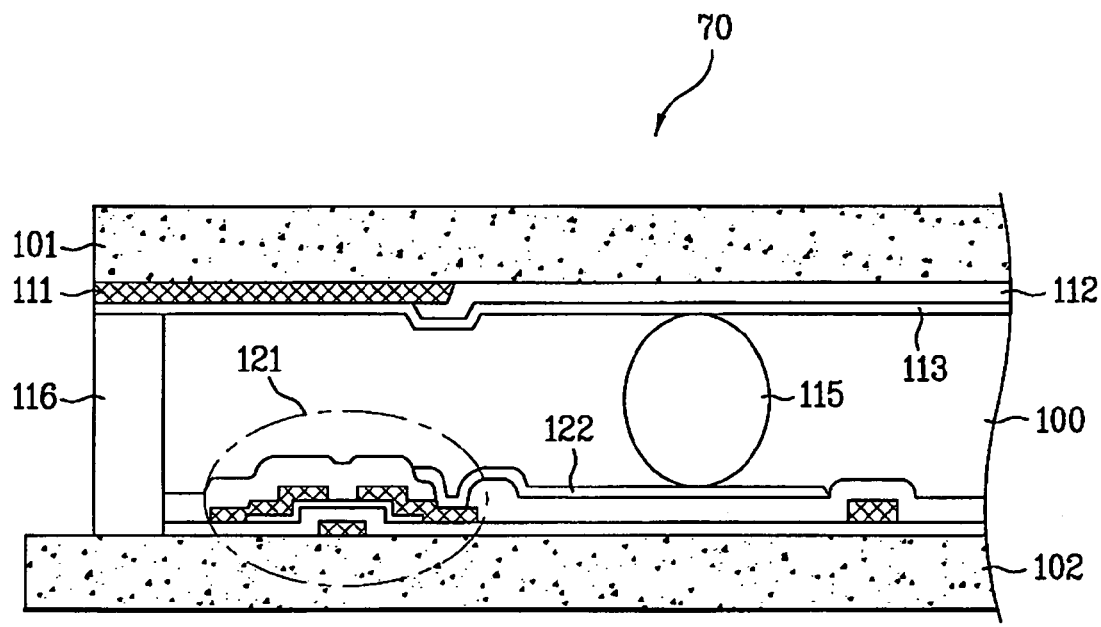
FIG. 1 is a cross section view of illustrating a related art LCD panel.
Figure 2:
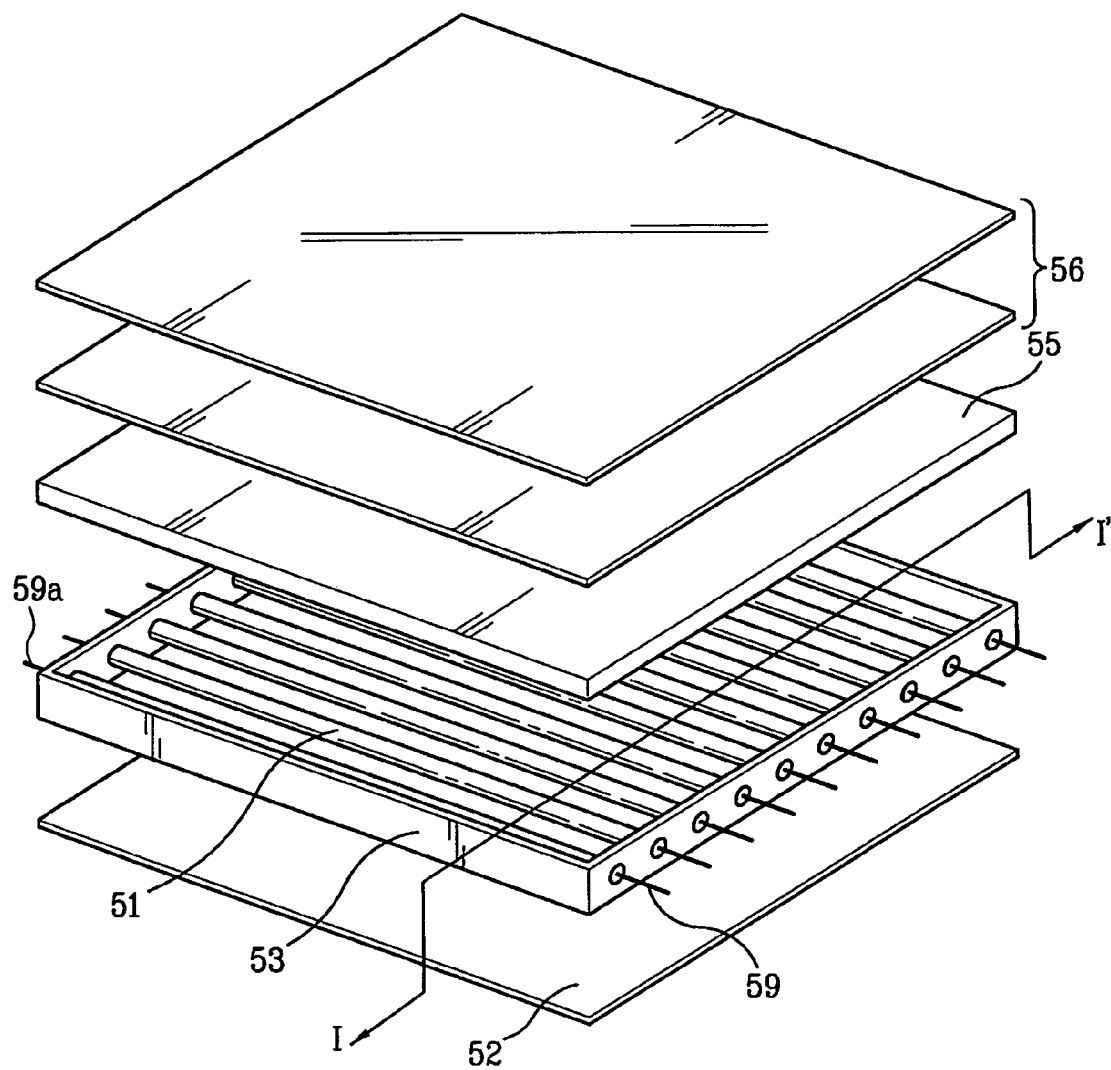
FIG. 2 is an exploded perspective view of illustrating a related art backlight assembly.
Figure 3:
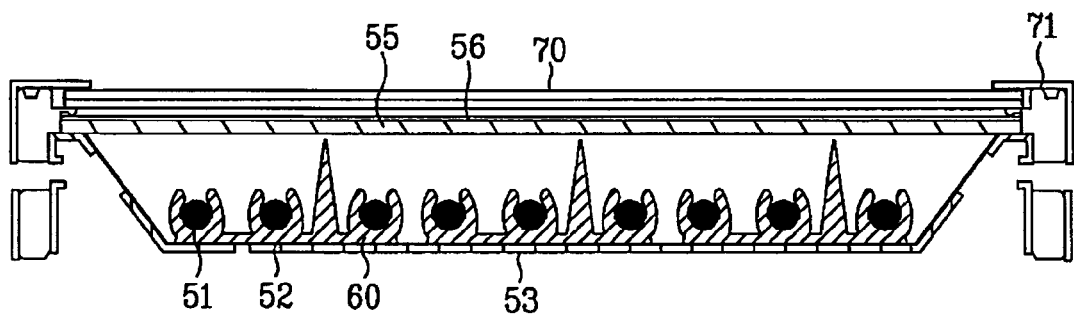
FIG. 3 is a cross section view along I-I' of FIG. 2.
Figure 4:
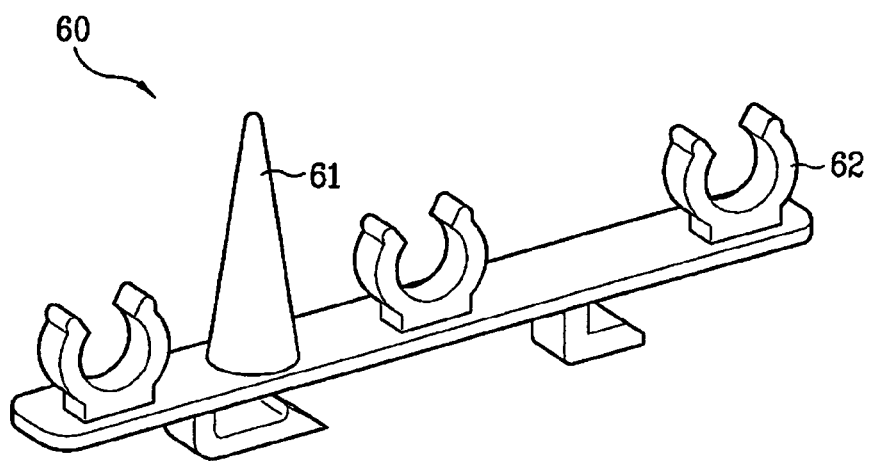
FIG. 4 is a perspective view of illustrating a related art lamp guide.
Figure 5:
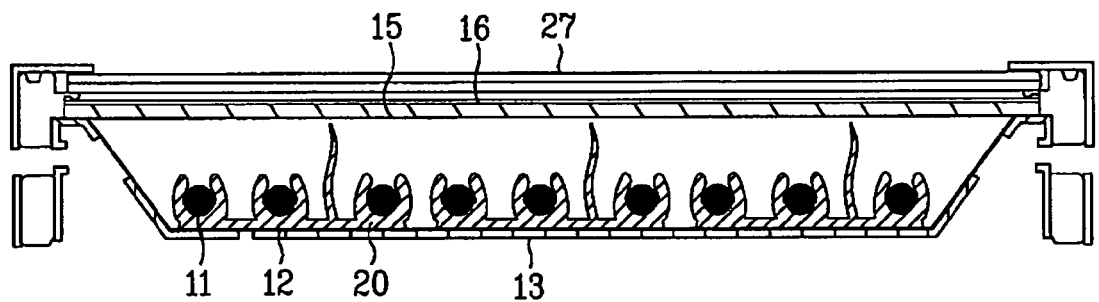
FIG. 5 is a cross section view of illustrating a backlight assembly of a first example.
Figure 6:
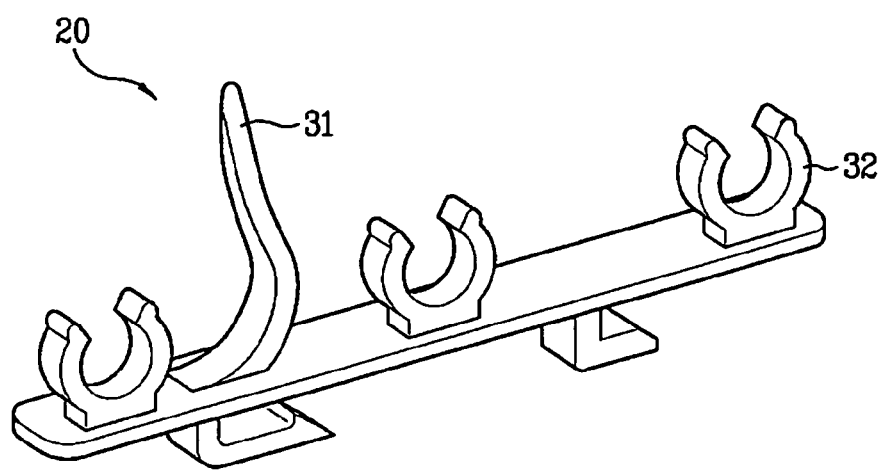
FIG. 6 is a perspective view of illustrating a lamp guide.
Figure 7:
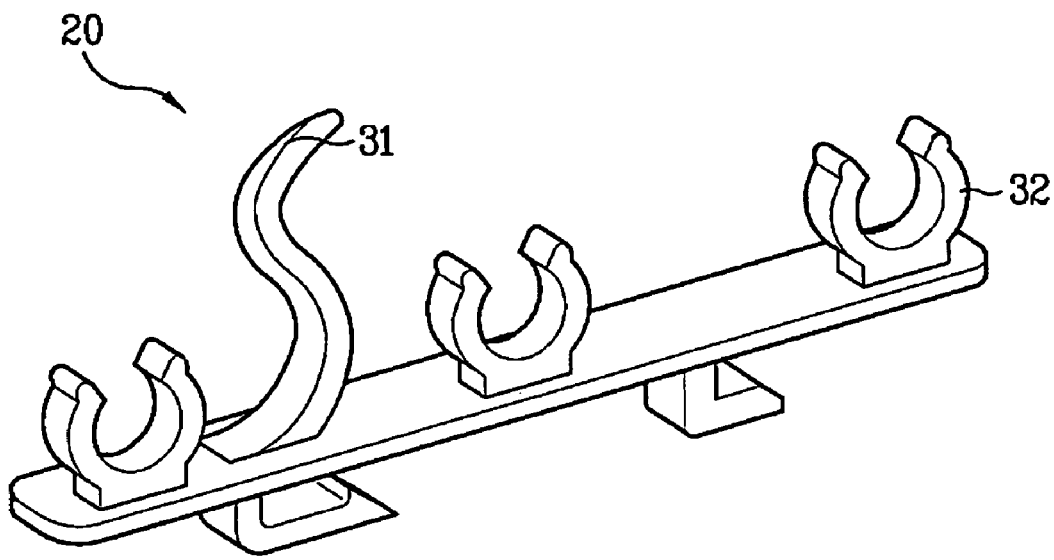
FIGS. 7 and 8 are perspective views illustrating a lamp guide of a second example.
Figure 8:
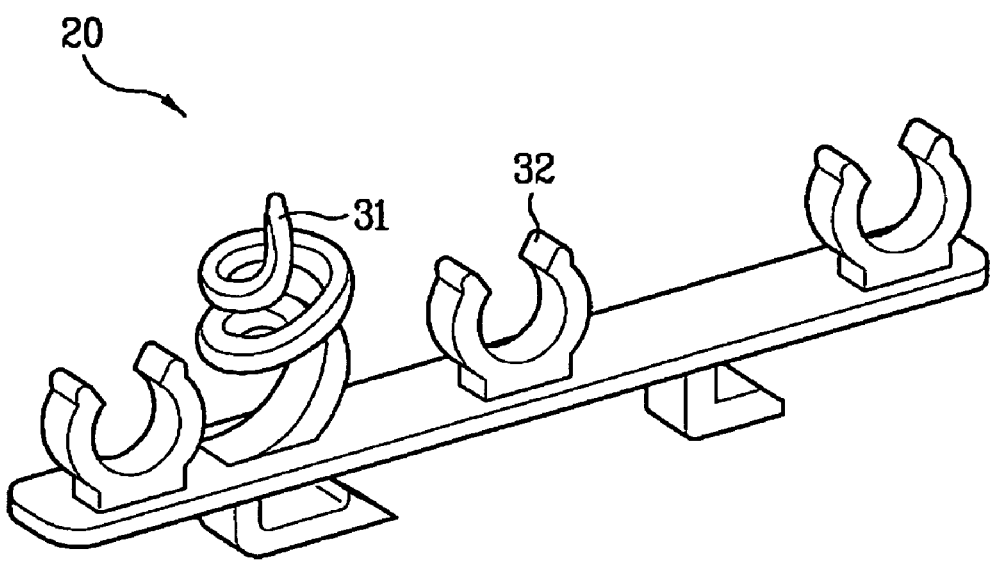

FIG. 5 is a cross-section view of illustrating a backlight assembly of a first example. FIG. 6 is a perspective view of illustrating the lamp guide of FIG. 5. FIGS. 7 and 8 are perspective views of illustrating a lamp guide of a second example.

As shown in FIG. 5, a first example of a direct-type backlight assembly includes a plurality of light-emission lamps 11 arranged at a fixed interval; a reflecting plate 12 provided on the bottom of the light-emission lamps 11; a diffusion plate 15 provided above the light-emission lamps 11; optical sheets 16 provided on the diffusion plate 15; a case 13 which fixes and supports the various elements including the light-emission lamps 11; a lamp guide 20 provided in, and connected with, the case 13; and support sides (not shown) provided at both ends of each light-emission lamp 11.

Each of the light-emission lamps 11 may formed in shape of a tube, which emits the light to an LCD panel. The tube may have a linear aspect or be formed in a sinuous shape. The reflecting plate 12 reflects light towards an LCD panel, and the diffusion plate 15 diffuses the light emitted from the light-emission lamps 11. The optical sheets 16 are provided to realize a uniform luminosity. The lamp guide 20 supports the light-emission lamps 11, such that the light-emission lamps 11 are disposed at a predetermined distance from the reflecting plate 12. Also, the lamp guide 20 absorbs the forces when an external force is applied to the diffusion plate 15. The support sides (not shown) fix the light-emission lamps 11.

The lamp guide 20 is provided in the space between the reflecting plate 12 and the diffusion plate 15. As shown in FIG. 6, the lamp guide 20 is comprised of a supporter 31 having a compressible structure which supports the diffusion plate 15 and absorbs the external force by varying in height; and a holder 32 which holds, fixes, and supports the light-emission lamps, wherein the holder 32 is formed integrally with the supporter 31. The number of supporters and holders for one lamp guide may vary. In FIG. 6, the lamp guide is provided with one supporter and three holders.

The supporter of the lamp guide has at least one curved portion which can absorb the imposed force. The lamp guide 20 of the present invention is provided with the supporter 31 having a compressible structure. That is, if a larger load force is applied to the supporter of the lamp guide, the supporter is decreased in height as a result of the compression of supporter structure. Accordingly, even though the load applied to the supporter of the lamp guide may increase due to the contact between the supporter of the lamp guide and the diffusion plate, or the physical distortion of LCD device, it is possible to prevent the diffusion plate from being damaged seriously, and to prevent distortion from occurring by the contact between the lamp guide and the diffusion plate.

The supporter of the lamp guide has at least one curved portion, and the supporter has a compressible structure. The curved portion of the lamp guide may vary in shape such that the lamp guide has the compressible structure of and the height thereof is variable, based on the applied load. As shown in FIG. 6, the supporter 31 may be formed as a hook-shaped structure having one curved portion. As shown in FIG. 7, the supporter 31 may be formed in a wave-shaped structure having at least two curved portions. As shown in FIG. 8, the supporter 31 may be formed in a spiral-shaped structure.

The lamp guide including the supporter 31, and the reflecting plate may be formed of materials which are substantially similar in reflectivity. For example, the supporter 31 may be formed of a high-polymer material such as polycarbonate (PC) or a metal material having a high elongation ratio such as aluminum (Al).

The case 13 supports the LCD panel 27 as well as the backlight assembly, such that the LCD panel 27 is provided above the backlight assembly. A bezel of, for example, stainless steel may be provided outside the case 13, surrounding the circumferential part of the LCD panel except in an effective display area.

In order to form the light-emission lamp 11, a fluorescent substance is coated onto an inner surface of a tube, and the tube is filled with a discharge gas of neon (Ne), argon (Ar) or hydrargyrum (Hg). A voltage is supplied to both ends of the tube through power wires, whereby the light-emission lamp 11 is turned on. The light-emission lamp 11 is not in contact with the reflecting plate 12; that is, the light-emission lamp 11 is displaced from the reflecting plate 12 by a distance of about 4~6 mm, and the light is emitted from the entire surface of the light-emission lamp 11. The light-emission lamp 11 is inserted into a slot of the support side (not shown).

The optical sheets 16 are include a diffusion sheet, a prism sheet and a protective sheet. The diffusion sheet uniformly diffuses the light emitted from the light-emission lamp 11. Also, the prism sheet is positioned on the diffusion sheet, so that the prism sheet concentrates the light diffused by the diffusion sheet, and transmits the concentrated light to the LCD device. The protective sheet protects the several optical sheets provided on the prism sheet.

The light emitted from the light-emission lamp 11 is transmitted to the information display area through the diffusion plate 15 and the optical sheets 16.

The supporter 31 of the lamp guide is formed as a compression structure having at least one curved portion, whereby the height of the supporter is variable based on the external applied force.

Thus, even though the load applied to the supporter of the lamp guide increases due to the contact between the supporter portion of the lamp guide and the diffusion plate, or due to the distortion of the LCD device, it is possible to prevent the diffusion plate from being seriously damaged, and to prevent distortion from occurring by the contact between the lamp guide and the diffusion plate.

The supporter of the lamp guide has the compressible structure to absorb the external force, so that it is possible to prevent the diffusion plate from being damaged by the supporter of the lamp guide. Thus, the light emitted from the light-emission lamp is uniformly diffused to the entire surface of the diffusion plate, preventing images from being blurring due to the diffusion plate.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A backlight assembly comprising:
   at least one lamp;
   a diffusion plate provided above the lamp;
   a lamp guide, wherein the lamp guide has a supporter formed in shape of a wave, and wherein the supporter supports the diffusion plate.

2. The backlight assembly of claim 1, further comprising a reflecting plate disposed under the lamp guide, wherein the supporter is formed of a material having substantially the same reflectivity as the reflecting plate.

3. The backlight assembly of claim 2, wherein the supporter is formed at least one of polycarbonate (PC) or metal.

4. The backlight assembly of claim 1, further comprising a reflecting plate disposed under the lamp guide, wherein the lamp guide has a holder which maintains a predetermined distance between the lamp and the reflecting plate.

5. The backlight assembly of claim 4, wherein the supporter is formed integrally with the holder.

6. The backlight assembly of claim 5, wherein the lamp guide is provided with one supporter and at least one holder.

7. The backlight assembly of claim 1, further comprising optical sheets disposed on the diffusion plate.

8. The backlight assembly of claim 1, further comprising a reflecting plate disposed under the lamp guide, wherein the at least one lamp is displaced from the reflecting plate by a distance of about 4~6mm.

9. A backlight assembly comprising:
   at least one lamp provided under an liquid crystal display (LCD) panel including two opposite substrates and a liquid crystal layer disposed between the two opposite substrates;
   a reflecting plate disposed below the lamp;
   a diffusion plate disposed above the lamp; and
   a lamp guide disposed between the reflecting plate and the lamp, wherein the lamp guide has a supporter formed in shape of a wave, and wherein the supporter supports the diffusion plate.

10. The backlight assembly of claim 9, wherein the supporter is formed of a material having reflecting properties substantially the same as that of the reflecting plate.

11. The backlight assembly of claim 9, wherein the lamp guide has a holder to maintain a predetermined distance between the light-emission lamp and the reflecting plate.

12. The backlight assembly of claim 11, wherein the supporter is formed integrally with the holder.

13. The backlight assembly of claim 12, wherein the lamp guide is provided with one supporter and at least one holder.

14. The backlight assembly of claim 9, further comprising optical sheets disposed on the diffusion plate.

15. The backlight assembly of claim 11, wherein the at least one lamp is displaced from the reflecting plate by a distance of about 4~6mm.

\* \* \* \* \*